United States Patent
Kitano et al.

(10) Patent No.: US 8,072,682 B2
(45) Date of Patent: Dec. 6, 2011

(54) TRANSMISSIVE SCREEN AND DIFFUSION PLATE

(75) Inventors: Hirosi Kitano, Hyogo (JP); Takayuki Kimoto, Osaka (JP); Takaaki Tanaka, Osaka (JP); Kazuya Chiba, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/935,009

(22) PCT Filed: May 15, 2009

(86) PCT No.: PCT/JP2009/002130
§ 371 (c)(1),
(2), (4) Date: Sep. 28, 2010

(87) PCT Pub. No.: WO2009/141981
PCT Pub. Date: Nov. 26, 2009

(65) Prior Publication Data
US 2011/0019270 A1  Jan. 27, 2011

(30) Foreign Application Priority Data

May 20, 2008 (JP) .................. 2008-131519
Oct. 14, 2008 (JP) .................. 2008-265045

(51) Int. Cl.
*G03B 21/56* (2006.01)
(52) U.S. Cl. .................................. 359/460
(58) Field of Classification Search .......... 359/454–457, 359/460
See application file for complete search history.

(56) References Cited

U.S. PATENT DOCUMENTS

| 6,282,034 B1 * | 8/2001 | Onishi et al. ............. 359/456 |
| 6,327,091 B1 * | 12/2001 | Agano .................. 359/454 |
| 7,567,381 B2 * | 7/2009 | Kokuzawa et al. ........ 359/455 |
| 2002/0005985 A1 | 1/2002 | Murasugi et al. .......... 359/443 |
| 2005/0018286 A1 | 1/2005 | Yoon et al. .............. 359/457 |
| 2005/0200952 A1 * | 9/2005 | Niwa et al. .............. 359/459 |
| 2006/0039066 A1 * | 2/2006 | Abe et al. ............... 359/457 |

FOREIGN PATENT DOCUMENTS

| JP | 8-237583 | 9/1996 |
| JP | 10-246918 | 9/1998 |
| JP | 2001-238226 | 8/2001 |
| JP | 2001-296606 | 10/2001 |
| JP | 2003-287819 | 10/2003 |
| JP | 2004-045588 | 2/2004 |
| JP | 2005-018070 | 1/2005 |
| JP | 2005-049614 | 2/2005 |
| JP | 2005-114926 | 4/2005 |

OTHER PUBLICATIONS

International Search Report issued Aug. 11, 2009 in International (PCT) Application No. PCT/JP2009/002130.

* cited by examiner

*Primary Examiner* — Christopher Mahoney
(74) *Attorney, Agent, or Firm* — Wenderoth Lind & Ponack, L.L.P.

(57) ABSTRACT

A transmissive screen includes, sequentially from a projection side, a Fresnel lens having a condensing function, a diffusion plate for diffusing incident light, and a front-surface protective panel disposed facing the diffusion plate across an air flow layer of a predetermined interval. The front-surface protective panel partially absorbs visible light, and the visible light absorbance of the front-surface protective panel is made the highest compared with the Fresnel lens and the diffusion plate.

17 Claims, 12 Drawing Sheets

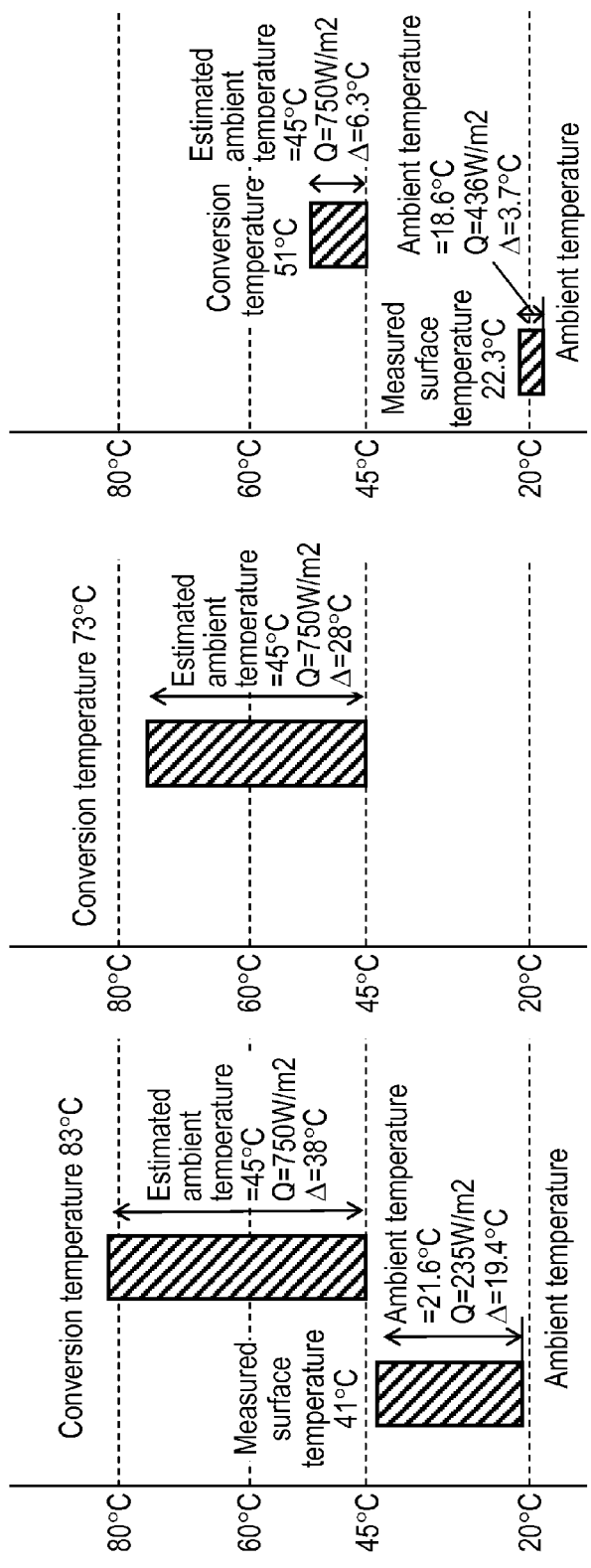

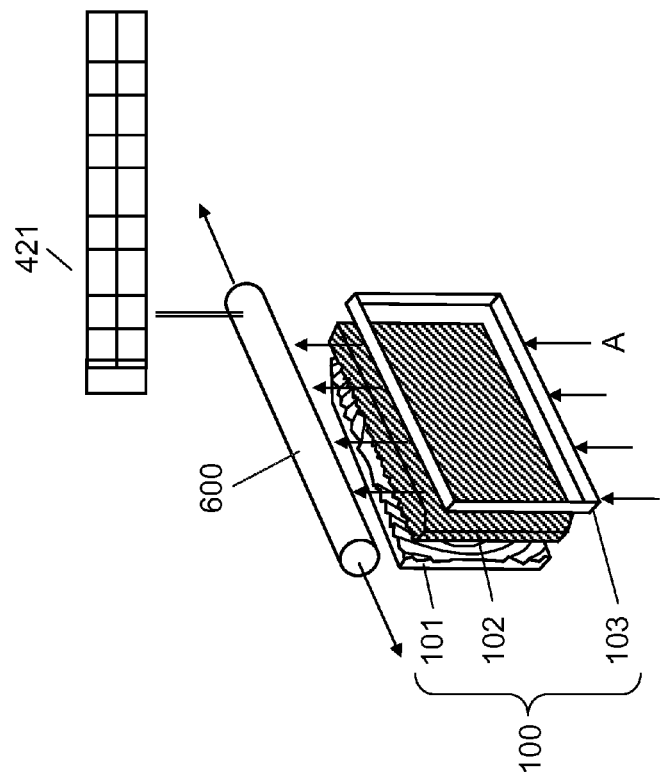
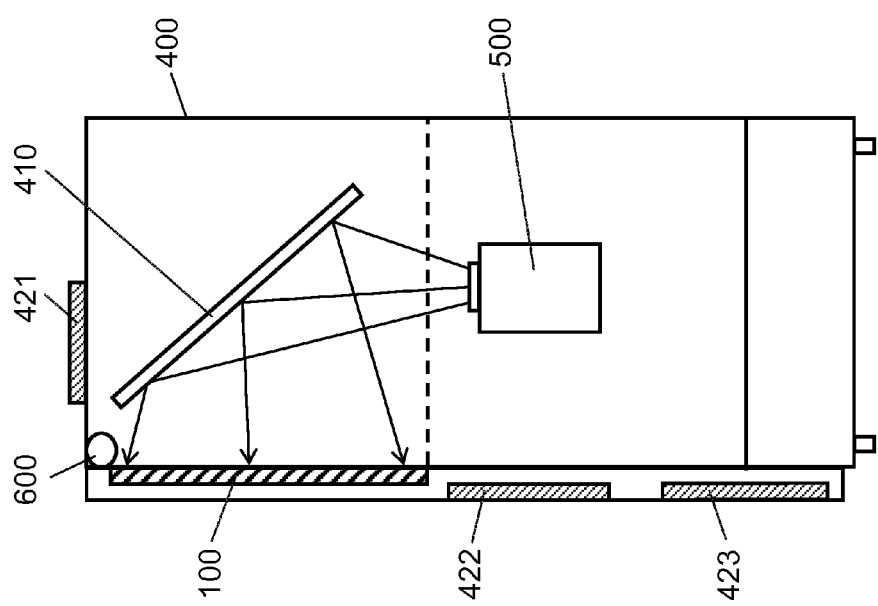

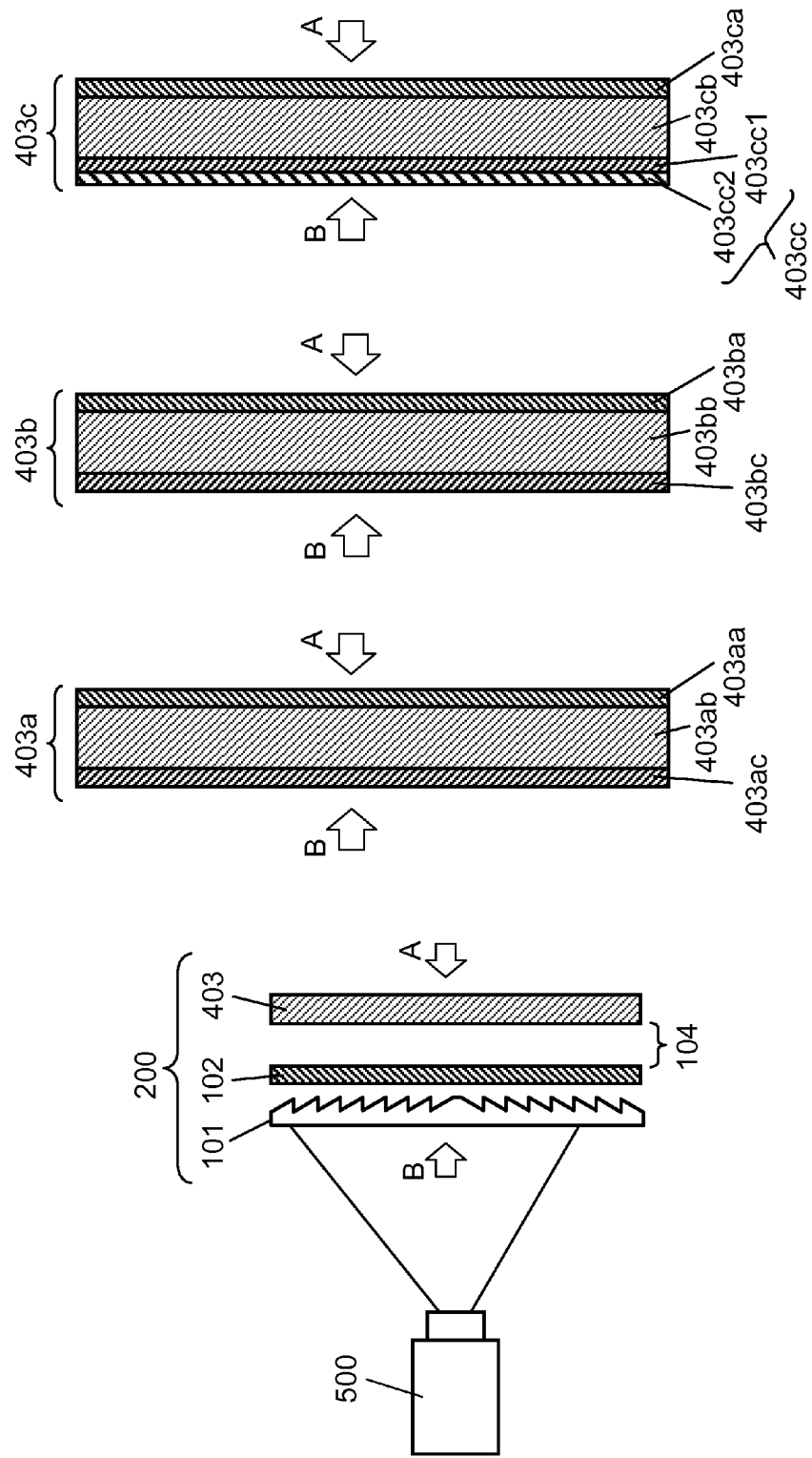

TRANSMISSIVE SCREEN AND DIFFUSION PLATE

This application is a U.S. national phase application of PCT International Application PCT/JP2009/002130, filed May 15, 2009.

BACKGROUND OF THE INVENTION

1. Technical Field

The present invention relates to a transmissive screen used in a rear projector, and particularly a heat resistant structure of the transmissive screen.

2. Background Art

Conventionally, in a rear-projection image projecting device using a projection tube or liquid crystal panel, namely in a rear projector, a transmissive screen is used that includes a Fresnel lens sheet having a lens with a saw-tooth cross section and a lenticular lens sheet having cylindrical lenses on its front and rear surfaces. In addition, transmissive screens having various structures are proposed in order to improve the contrast to outside light.

FIG. 11 is a sectional view showing a schematic structure of one example of a conventional transmissive screen. In FIG. 11, the conventional transmissive screen mainly includes Fresnel lens sheet 901, lenticular lens sheet 902, light diffusion layer 903, and transparent substrate 904. Projector 500 is installed behind the transmissive screen, and light from projector 500 is projected to the transmissive screen.

FIG. 12 is a partial sectional view showing a detailed structure of a conventional transmissive screen. In FIG. 12, the Fresnel lens sheet is omitted, and the lenticular lens sheet part that is particularly structured is enlarged.

As in FIG. 12, light diffusion layer 903 is formed by coating, by a printing method or the like, transparent substrate 904 with a material that is formed by dispersing light diffusion particulates into a binder made of a transparent material. Here, the refractive index of the particulates is different from that of a binder material. Lenticular lens sheet 902 is joined to light diffusion layer 903 with transparent adhesive 913 through light absorption layers (black stripe) 912. Light absorption layers 912 are disposed in land sections 911 having a substantially trapezoidal cross section on the emitting side of lenticular lens sheet 902.

When the outside light enters such a structure, the outside light diffused on light diffusion layer 903 is absorbed by light absorption layers (black stripe) 912 before a part of the outside light reaches a boundary with the air, and hence contrast reduction by the outside light is reduced. The phenomenon is prevented where a camber of an element causes a clearance between lenticular lens sheet 902 and light diffusion layer 903 to degrade the resolving power (for example, patent literature 1).

Recently, in a rear projector intended to be used as a digital advertisement pillar also in the outdoors, not only outside light contrast but also heat resistance to temperature increase by direct sunlight has been demanded.

In the conventional transmissive screen, however, the contrast to the outside light is improved by applying black stripe to the lenticular lens sheet. Therefore, when the transmissive screen is exposed to direct sunlight, the black stripe part absorbs light and hence the temperature of the lenticular lens sheet rapidly increases. Direct sunlight also increases the temperature inside a case of the rear projector, so that the temperature of the more inside elements is higher.

The Fresnel lens sheet and lenticular lens sheet are formed so that a specific cross-sectional shape can be formed at a predetermined accuracy. Therefore, the selection range of the material for them is small and it is difficult to use a transparent and heat-resistant material. The cross-sectional shape is complicated, so that this significantly influences the deformation by temperature increase. Thus, the conventional transmissive screen has a problem about heat resistance to direct sunlight.

When the rear projector is installed outdoors, the observation surface of the transmissive screen is exposed to the outside of the device. Therefore, the variety of installation conditions such as temperature/humidity or illumination is increased and unspecified person may touch the exposed part in various conditions, differently from the case where the projector is installed indoors. Therefore, it is important to secure the quality of the transmissive screen, such as strength against vibration or impact, weathering resistance, or visibility of a display image. Specifically, practical comprehensive measures are required which include measures against temperature increase inside the case by direct sunlight or the like, mechanical strength such as prevention of crack by vibration or impact, and measures against reflection of an image other than the display image.

Citation List

[Patent Literature]

[Patent Literature 1] Unexamined Japanese Patent Publication No. 2003-287819

SUMMARY OF THE INVENTION

A transmissive screen of the present invention includes, sequentially from the projection side, a Fresnel lens having a condensing function, a diffusion plate for diffusing incident light, and a front-surface protective panel disposed facing the diffusion plate across an air flow layer of a predetermined interval. The front-surface protective panel or diffusion plate partially absorbs visible light. Preferably, the visible light absorbance of the front-surface protective panel is made the highest comparing with the Fresnel lens and diffusion plate.

In this structure, by partially absorbing the outside light with the front-surface protective panel, the temperature increase of the diffusion plate and Fresnel lens can be suppressed while the contrast is kept. The temperature increase can be suppressed to the heat-resistant temperature of each material.

A transmissive screen of the present invention includes, sequentially from the projection side, a Fresnel lens having a condensing function, a diffusion plate for diffusing incident light, and a front-surface protective panel disposed facing the diffusion plate across an air flow layer of a predetermined interval. The front-surface protective panel has a layer for absorbing or reflecting infrared rays, or a layer for absorbing or reflecting ultraviolet rays.

The transmissive screen is not required to be transparent to infrared rays or ultraviolet rays other than the visible light. Such a structure can reduce the irradiation energy of direct sunlight and hence further improves the effect of suppressing the temperature increase.

A transmissive screen of the present invention includes, sequentially from the projection side, a Fresnel lens having a condensing function, a diffusion plate for diffusing incident light, and a front-surface protective panel disposed facing the diffusion plate across an air flow layer of a predetermined interval. The front-surface protective panel has a protective substrate, a front-surface protective layer disposed on the observer side of the protective substrate, and a rear-surface protective layer disposed on the projection side of the protective substrate.

Such a structure can achieve a transmissive screen of an outdoor rear projector that satisfies heat resistance to direct sunlight, has high visibility, is strong to the vibration or impact, and has high quality.

BRIEF DESCRIPTION OF DRAWINGS

FIG. 8A is a diagram showing an experimental result of temperature increase of the transmissive screen of the present invention.

FIG. 8B is a diagram showing another experimental result of temperature increase of the transmissive screen of the present invention.

FIG. 8C is a diagram showing yet another experimental result of temperature increase of the transmissive screen of the present invention.

FIG. 8D is a diagram showing the structure of the transmissive screen corresponding to FIG. 8A.

FIG. 8E is a diagram showing the structure of the transmissive screen corresponding to FIG. 8B.

FIG. 8F is a diagram showing the structure of the transmissive screen corresponding to FIG. 8C.

FIG. 9A is a diagram for illustrating a cooling method of the transmissive screen when power supply to a rear projector stops due to a power failure or the like.

FIG. 9B is a diagram for illustrating the cooling method of the transmissive screen when power supply to the rear projector stops due to the power failure or the like.

FIG. 10A is a sectional view showing a schematic structure of a front-side protective panel of a transmissive screen in accordance with a third exemplary embodiment of the present invention.

FIG. 10B is a sectional view showing another schematic structure of the front-side protective panel of the transmissive screen in accordance with the third exemplary embodiment of the present invention.

FIG. 10C is a sectional view showing yet another schematic structure of the front-side protective panel of the transmissive screen in accordance with the third exemplary embodiment of the present invention.

FIG. 10D is a sectional view showing still another schematic structure of the front-side protective panel of the transmissive screen in accordance with the third exemplary embodiment of the present invention.

DETAILED DESCIPTION OF THE INVENTION

Exemplary embodiments of the present invention will be described hereinafter with reference to the accompanying drawings.

First Exemplary Embodiment

Figure 1B:
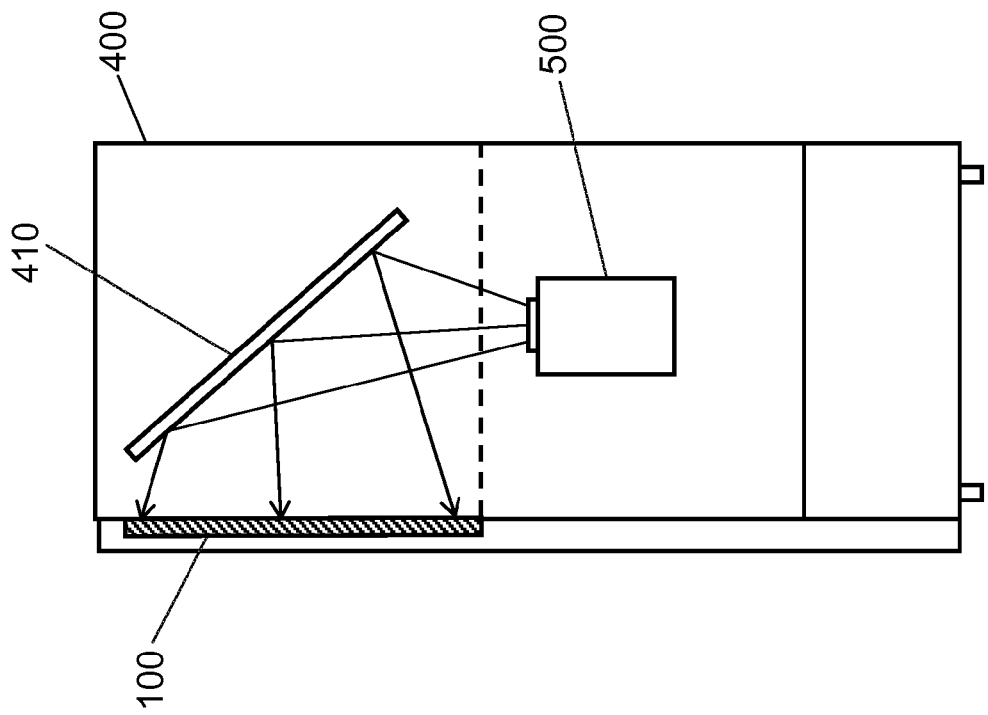
FIG. 1B is a diagram showing an internal structure of the rear projector mounted with the transmissive screen in accordance with the first exemplary embodiment of the present invention.
Figure 1A:
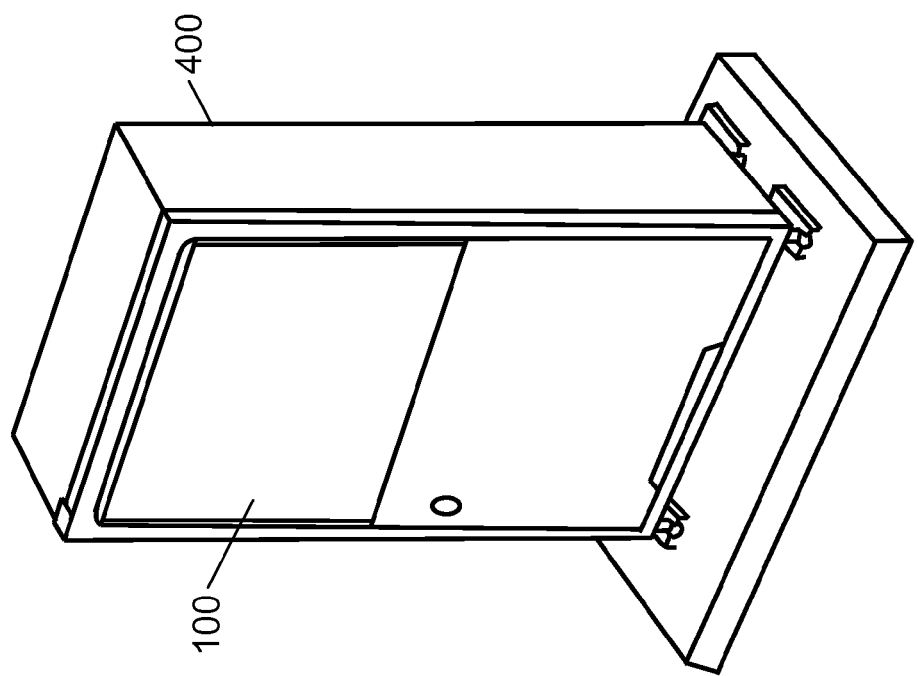
FIG. 1A is a perspective view showing an appearance of a rear projector mounted with a transmissive screen in accordance with a first exemplary embodiment of the present invention.

FIG. 1 is a schematic diagram showing a rear projector mounted with a transmissive screen in accordance with a first exemplary embodiment of the present invention. FIG. 1A is a perspective view showing the appearance, and FIG. 1B is a diagram showing the internal structure. Projector 500 is installed in case 400. Transmissive screen 100 is mounted to an opening in case 400 so as to be visible from the outside. Generally, reflector 410 is installed in case 400 in order to secure the optical length from projector 500 to transmissive screen 100 and store elements in case 400.

Figure 2:
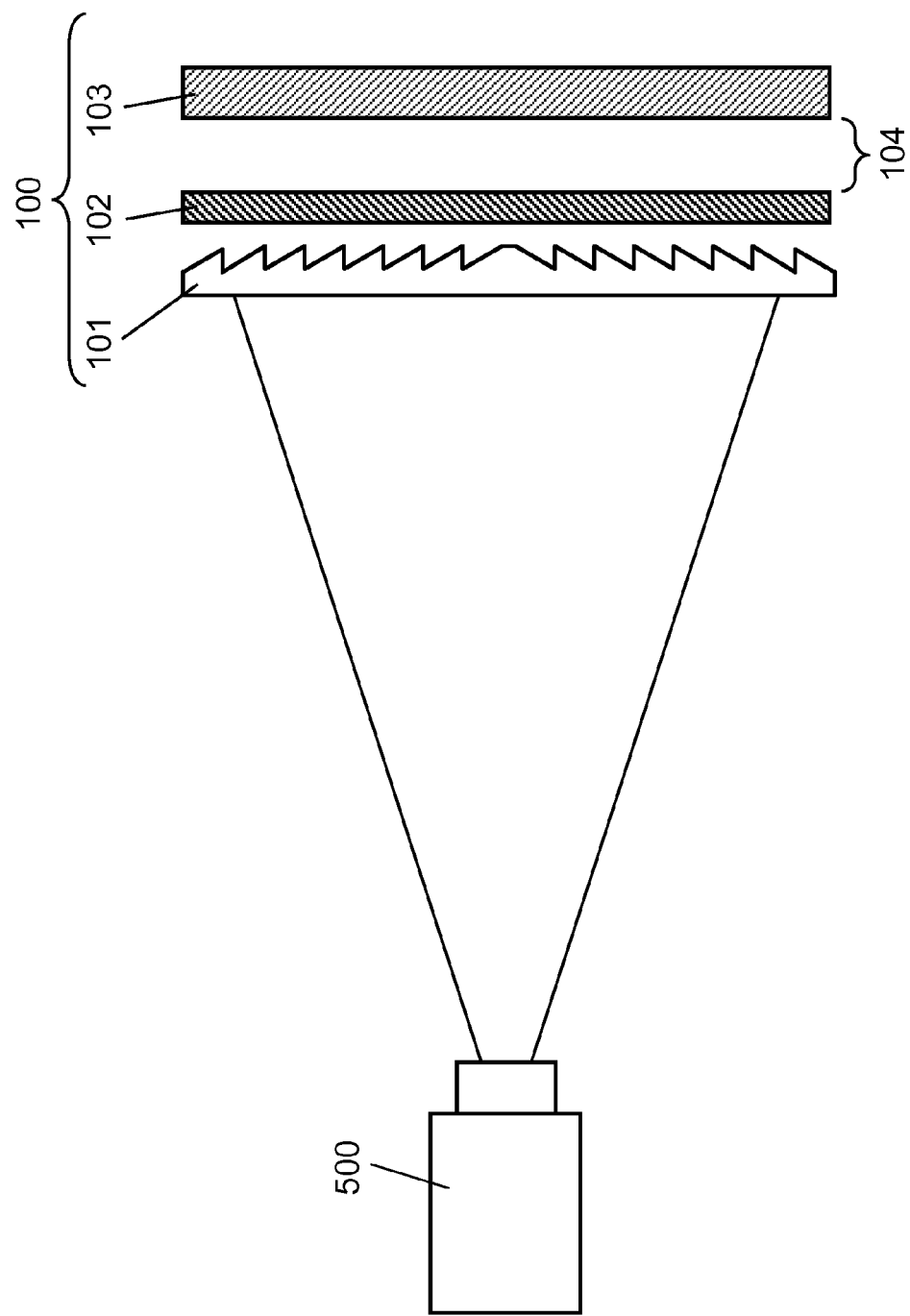
FIG. 2 is a sectional view showing a detailed structure of the transmissive screen in accordance with the first exemplary embodiment of the present invention.

FIG. 2 is a sectional view showing a detailed structure of transmissive screen 100 of the present invention. In FIG. 2, case 400 and reflector 410 shown in FIG. 1 is omitted. In FIG. 2, transmissive screen 100 of the present invention includes, sequentially from the projector 500 side, Fresnel lens 101, diffusion plate 102, and front-surface protective panel 103.

Fresnel lens 101 is formed concentrically so as to have a saw-tooth cross section, and has a function of condensing dispersed projected light to the observer side. Diffusion plate 102 is a plate-like member or a sheet-like member for diffusing the projected light. Diffusion plate 102 is formed by mixing one or more kinds of particulates as a scattering factor into acrylic resin or another transparent substrate. The particulates have a refractive index different from that of the substrate, Front-surface protective panel 103 is a plate-like member formed of a transparent substrate. As a material of the transparent substrate, a material such as glass, acrylic resin, or polycarbonate resin that has high transparency, has high physical strength, and is apt to be processed into a plate shape. Front-surface protective panel 103 is colored by being made to contain tint material so as to partially absorb visible light.

Diffusion plate 102 and front-surface protective panel 103 are held so as to keep a predetermined distance, and the distance forms a space (air flow layer 104) allowing flow of air. The predetermined distance has a value allowing natural convection or forced cooling of air without requiring bonding or the like between front and rear elements.

A rear projector mounted with transmissive screen 100 having such a structure is often installed not only indoors but also outdoors. When it is installed outdoors, the transmissive screen needs to be protected from physical breakage. However, transmissive screen 100 of the present invention has plate-like front-surface protective panel 103 of high physical strength, so that the screen is protected.

Next, operation against temperature increase of transmissive screen 100 of the present invention having such a structure is described. The transmissive screen used outdoors is required to secure contrast and heat resistance in direct sunlight. When the transmissive screen is exposed to direct sunlight outdoors, not only the black stripe but also colored tint layer absorbs light more than a transparent medium, and hence the temperature is apt to increase. When the transmissive screen is exposed to direct sunlight outdoors, the temperature inside the rear projector closed by case 400 becomes higher than atmospheric temperature, and the temperature of an element disposed in more inside of case 400 is higher.

Figure 3:
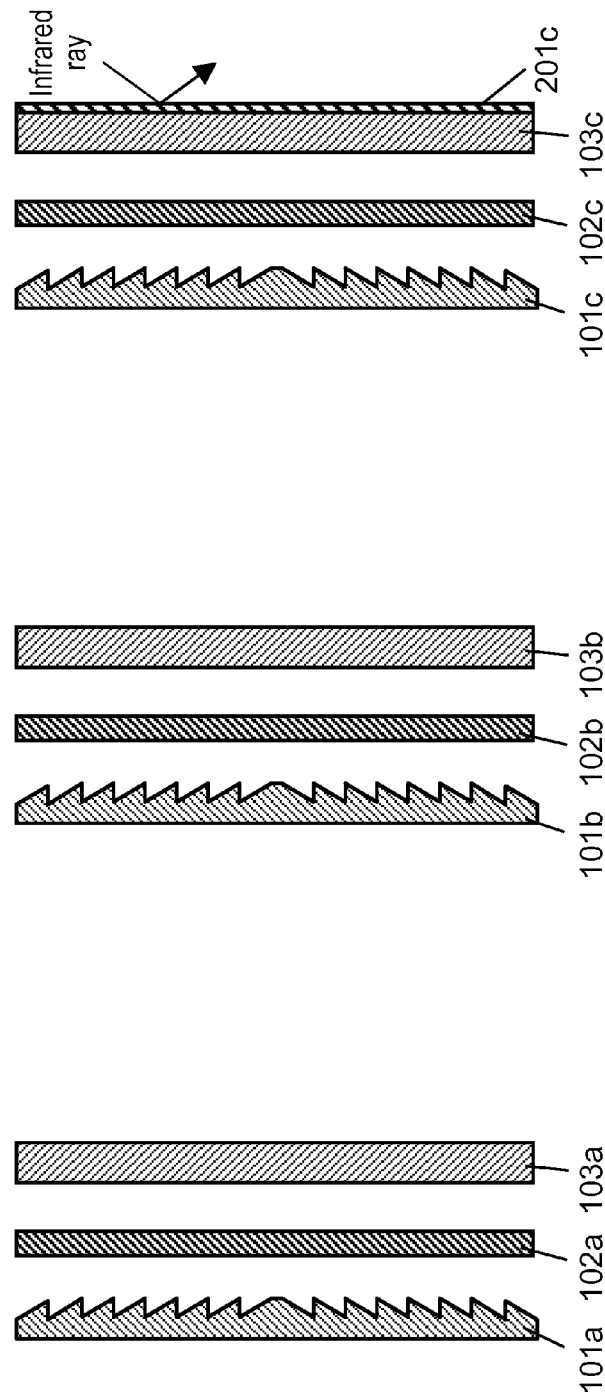
FIG. 3A is a diagram showing the temperature increase graph of a transmissive screen.
FIG. 3B is a diagram showing the temperature increase graph of another transmissive screen.
FIG. 3C is a diagram showing the temperature increase graph of yet another transmissive screen.
FIG. 3D is a diagram showing the structure of the transmissive screen corresponding to FIG. 3A.
FIG. 3E is a diagram showing the structure of the transmissive screen corresponding to FIG. 3B.
FIG. 3F is a diagram showing the structure of the transmissive screen corresponding to FIG. 3C.

The outline of this temperature increase is illustrated with reference to the accompanying drawings. FIG. 3 is a diagram for illustrating difference in temperature increase that depends on difference in structure of the transmissive screen. FIG. 3A through FIG. 3C are diagrams showing temperature graphs of transmissive screens. FIG. 3D through FIG. 3F are diagrams showing the structures of the transmissive screens corresponding to FIG. 3A through FIG. 3C.

FIG. 3D shows a structure for comparing the effect of the transmissive screen of the present invention. In this structure, it is assumed that total absorbance of light is equal to that in the present invention but diffusion plate 102 disposed in the center absorbs light most differently from the present invention. In FIG. 3A, sequentially from the inside of the case, the internal temperature of the case is denoted with Tb, the temperature of Fresnel lens 101 is denoted with T1, the temperature of diffusion plate 102 is denoted with T2, the temperature of front-surface protective panel 103 is denoted with T3, and the atmospheric temperature outside the case is denoted with Ta.

Internal temperature Tb is higher than atmospheric temperature Ta at least due to energy of light reaching the inside. Temperature T1 of the Fresnel lens is higher than Tb because the lens absorbs a part of the incident light. Similarly, temperature T3 of the front-surface protective panel is higher than Ta because the panel absorbs a part of the incident light. The light absorbance of diffusion plate 102 existing in the center is assumed to be the highest in this structure, so that diffusion plate 102 absorbs the incident light most, and temperature T2 of the diffusion plate becomes highest.

FIG. 3E shows the structure of the transmissive screen of the present invention. In this structure, the total absorbance of light is equal to that in the structure of FIG. 3D, but front-surface protective panel 103 absorbs light most. In the temperature graph of FIG. 3B, sequentially from the inside of the case, the internal temperature of the case is denoted with Tb, the temperature of Fresnel lens 101 is denoted with T1, the temperature of diffusion plate 102 is denoted with T2, the temperature of front-surface protective panel 103 is denoted with T3, and the atmospheric temperature outside the case is denoted with Ta.

Internal temperature Tb is higher than atmospheric temperature Ta similarly to the structure of FIG. 3D. Temperature T1 of Fresnel lens is also higher than Tb. Temperature T3 of the front-surface protective panel is also higher than Ta, but this difference is larger than that of the structure of FIG. 3D because the front-surface protective panel absorbs a part of the incident light most of all three elements. In this structure, it is estimated that temperature T2 of the diffusion plate existing in the center is similar to that of Fresnel lens 101 existing in the case, and is an intermediate temperature between T1 and T2 because the diffusion plate exists between the Fresnel lens and the front-surface protective panel.

In the structure of the transmissive screen of the present invention, front-surface protective panel 103 is formed of a tint layer so as to absorb a part of transmitting visible light, so that the temperature increase of the diffusion plate and the Fresnel lens can be suppressed.

Even when the visible light absorbance of front-surface protective panel 103 is made highest to enlarge the temperature increase, the temperature of front-surface protective panel 103 is kept at a value somewhat higher than atmospheric temperature Ta. This is because front-surface protective panel 103 is disposed at the position contact with the atmosphere outside the case. Thus, cooling is easy.

Figure 4:
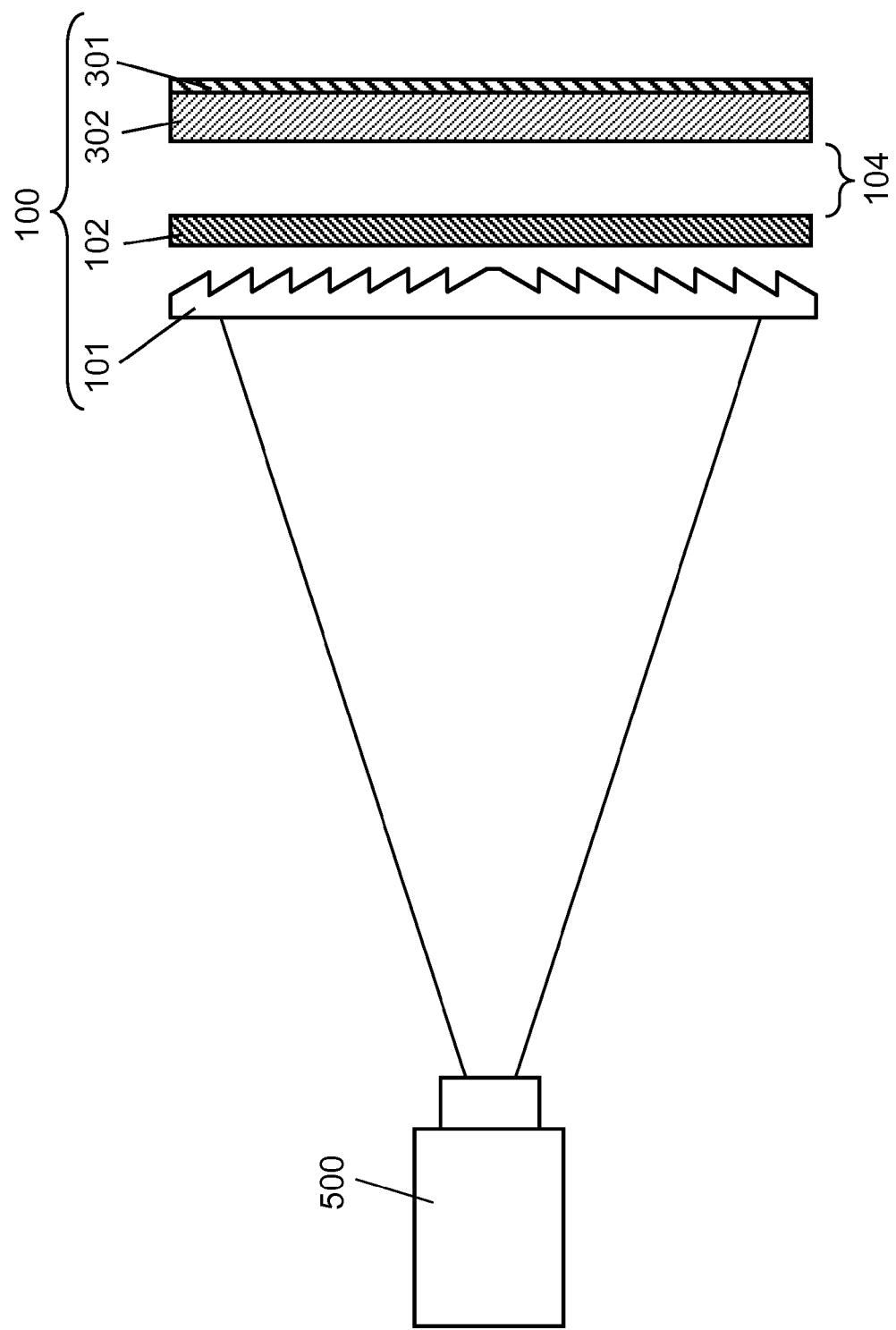
FIG. 4 is a sectional view showing a schematic structure of another example of the transmissive screen in accordance with the first exemplary embodiment of the present invention.

As front-surface protective panel 103, a tint layer that contains dispersed tint material and absorbs a part of visible light with the whole material may be used. As shown in FIG. 4, front-surface protective panel 103 may be formed by sticking tint sheet 301 colored with dye or the like to transparent base 302. These front-surface protective panels can produce an effect similar to the above-mentioned effect.

Tint may be disposed on both of front-surface protective panel 103 and diffusion plate 102 so that appropriate temperature distribution is obtained in response to the relationship between the transmissive screen and the case. At this time, when the visible light absorbance of front-surface protective panel 103 is set to be highest comparing with Fresnel lens 101 and diffusion plate 102, an effect similar to that of the present invention can be produced.

As in the structures of the present invention, mounting a front-surface protective panel having a sufficient physical strength prevents occurrence of problems about protection of the whole screen even when the screen is assumed to be used outdoors. The tint layer itself is secured as the whole front-surface protective panel or the like, so that the contrast reduction is not caused comparing with the conventional art even in outdoor use.

Second Exemplary Embodiment

Figure 5:
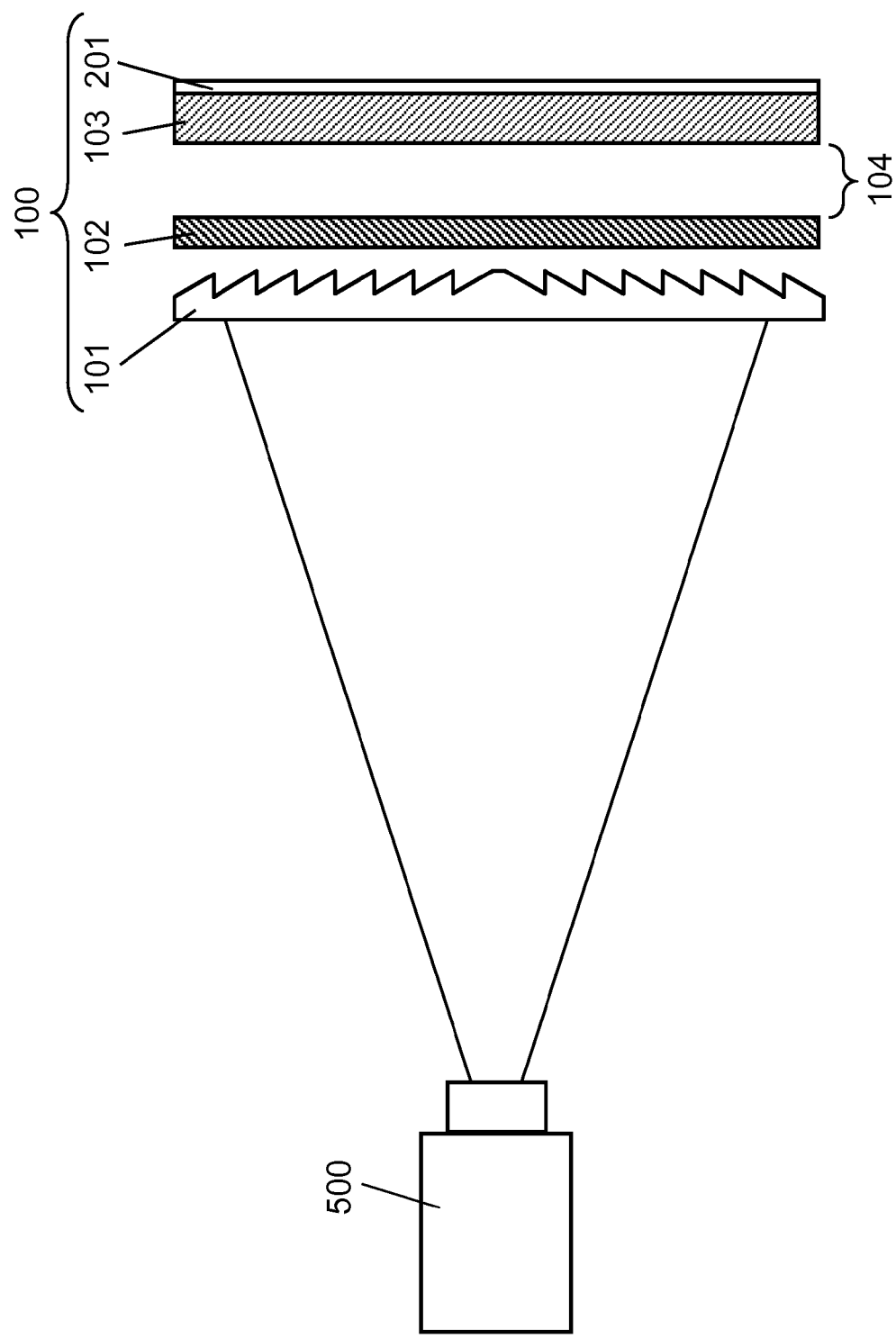
FIG. 5 is a sectional view showing a schematic structure of a transmissive screen in accordance with a second exemplary embodiment of the present invention.

FIG. 5 is a sectional view showing a schematic structure of a transmissive screen in accordance with a different exemplary embodiment of the present invention. In FIG. 5, elements similar to those in FIG. 2 are denoted with the same reference marks, and the descriptions of those elements are omitted.

The structure in FIG. 5 differs from the structure in FIG. 2 in that infrared reflecting layer 201 is disposed on the surface of front-surface protective panel 103. The transmissive screen does not need to be transparent to infrared rays and ultraviolet rays other than the visible light, and this structure can reduce the irradiation energy of direct sunlight and hence the effect of suppressing the temperature increase is further improved.

Figure 6:
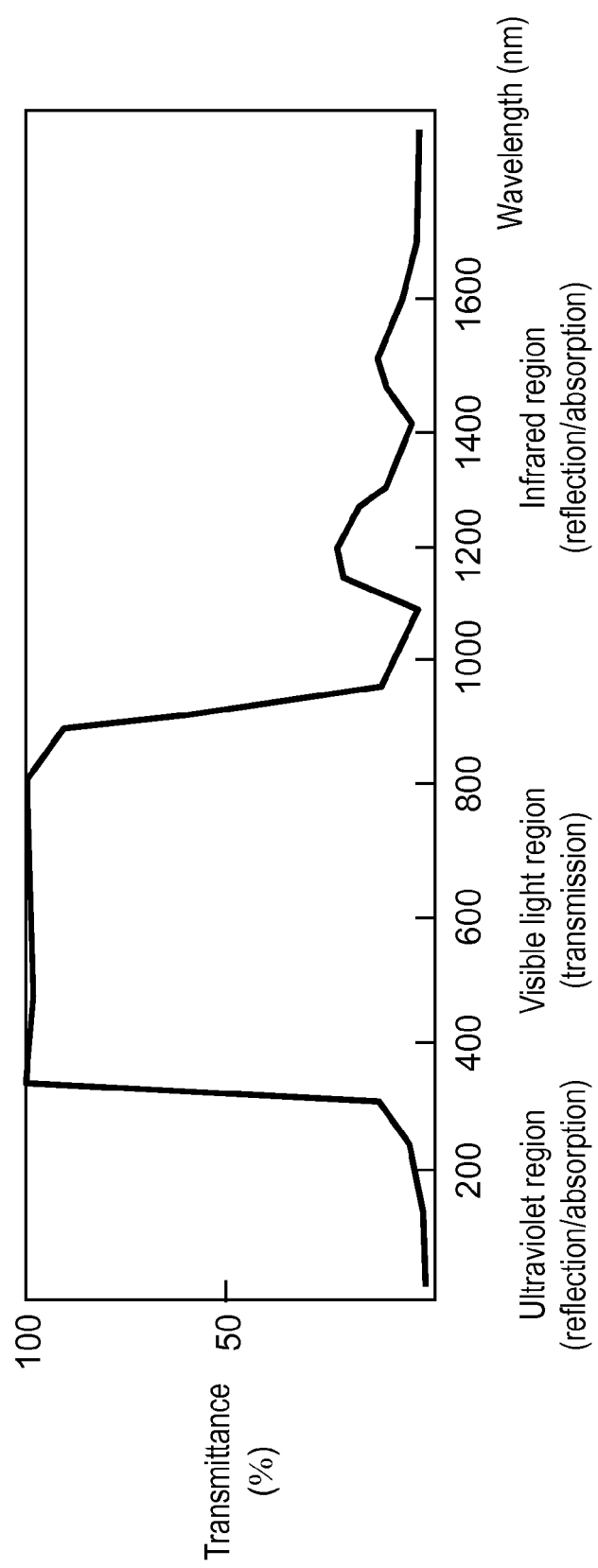
FIG. 6 is a diagram showing an example of an optical characteristic related to the transmittance of a front-side protective panel in accordance with the second exemplary embodiment of the present invention.

In the present invention, also when a layer for absorbing infrared rays is disposed instead of infrared reflecting layer 201, the irradiation energy of direct sunlight can be reduced. Also when a layer for reflecting ultraviolet rays or a layer for absorbing ultraviolet rays is disposed, the irradiation energy of direct sunlight can be reduced. Also when a multilayer for reflecting both infrared rays and ultraviolet rays or a multilayer for absorbing both infrared rays and ultraviolet rays is disposed, the irradiation energy of direct sunlight can be reduced. FIG. 6 shows an example of an optical characteristic related to the transmittance of front-side protective panel 103. As shown in FIG. 6, the transmittance is about 100% in the visible light region, but the transmittance extremely reduces in the ultraviolet region of a wavelength shorter than that of visible light and in the infrared region of a wavelength longer than that of visible light. Thanks to this characteristic, front-surface protective panel 103 has a function of transmitting only visible light and reflecting or absorbing the light in the ultraviolet region and infrared region. Paint having an antistatic function is applied to the surface of front-surface protective panel 103 that is exposed outside case 400. As the applying method, coat spray or ion shower can be used. Thanks to this structure, front-surface protective panel 103 can prevent electrification, and the surface of transmissive screen 100 on the side exposed outside case 400 is not charged. Therefore, in the rear projector mounted with transmissive screen 100, a charged foreign matter does not adhere to the surface of transmissive screen 100 and the surface of transmissive screen 100 can be kept in a clean state having no dirt.

The outline of the temperature increase of the elements in such a structure is described with reference to FIG. 3A through FIG. 3F. FIG. 3F shows the structure of the transmissive screen of the present embodiment. This structure differs from that of FIG. 3E only in that infrared reflecting layer 201 is disposed, and front-surface protective panel 103 absorbs light most as a tint layer. In the temperature graph shown in FIG. 3C, sequentially from the inside of the case, the internal temperature of the case is denoted with Tb, the temperature of Fresnel lens 101 is denoted with T1, the temperature of diffusion plate 102 is denoted with T2, the temperature of front-surface protective panel 103 is denoted with T3, and the atmospheric temperature outside the case is denoted with Ta.

In this structure, the energy reflected on infrared reflecting layer 201, of radiated direct sunlight, is lower than that in FIG. 3E, and the other elements are the same as those in FIG. 3E. Therefore, relative graph shape of the increments of internal temperature Tb, temperature T1 of Fresnel lens, temperature T2 of the diffusion plate, and temperature T3 of the front-surface protective panel from atmospheric temperature Ta is appropriate to that in FIG. 3B, though all absolute values are lower. Thus, in a transmissive screen with the structure of the present embodiment, the suppressing effect of temperature increase can be increased. FIG. 3F shows an example where infrared reflecting layer 201 is disposed on the front side of front-surface protective panel 103; however, infrared reflecting layer 201 may be disposed on the rear side of front-surface protective panel 103.

EXAMPLE 1

Experiments for recognizing the effect of suppressing temperature increase of the transmissive screen of the present invention are performed. The results of the experiments are shown in FIG. 7A through FIG. 7C and FIG. 8A through FIG. 8C. FIG. 7D through FIG. 7F show the structures of the transmissive screens corresponding to FIG. 7A through FIG. 7C, and FIG. 8D through FIG. 8F show the structures of the transmissive screens corresponding to FIG. 8A through FIG. 8C.

FIG. 7D through FIG. 7F show the structures for comparing the degree of the effect of the transmissive screen of the present invention. Fresnel lens 101 and front-surface protective panel 103 that is made of acrylic resin are the same as the present invention, but lenticular lens sheet 802 having a black stripe corresponding to the conventional structure is used instead of a diffusion plate.

The structures of FIG. 8D through FIG. 8F are the same as those of the transmissive screens of the present invention, and include Fresnel lens 101, diffusion plate 102, and front-surface protective panel 103 that is made of acrylic resin.

In the experiments, both in FIG. 7A through FIG. 7C and FIG. 8A through FIG. 8C, a transmissive screen having a shown structure is mounted to a case of a projector for the outdoors, and the temperature increase from the ambient temperature is measured after light of a predetermined energy is radiated for a certain time. Here, this light is assumed to be direct sunlight. The temperature measuring part is the surface of lenticular lens sheet 802 in the structures of FIG. 7D through FIG. 7F, or the surface of diffusion plate 102 in the structure of the present invention in FIG. 8.

Figure 7A:
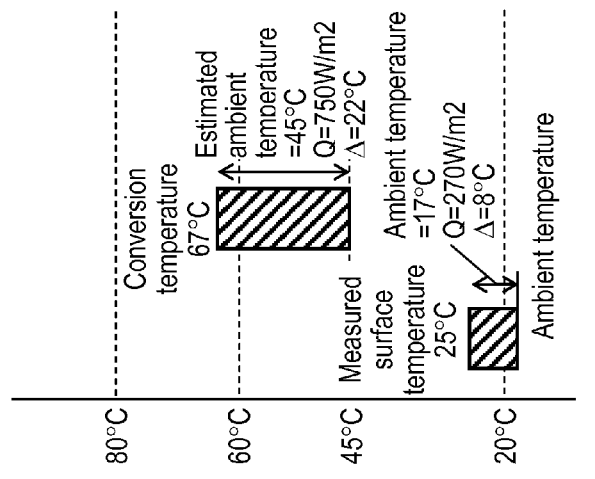
FIG. 7A is a diagram showing a result of a comparative experiment of temperature increase using a lenticular lens sheet.
Figure 7B:
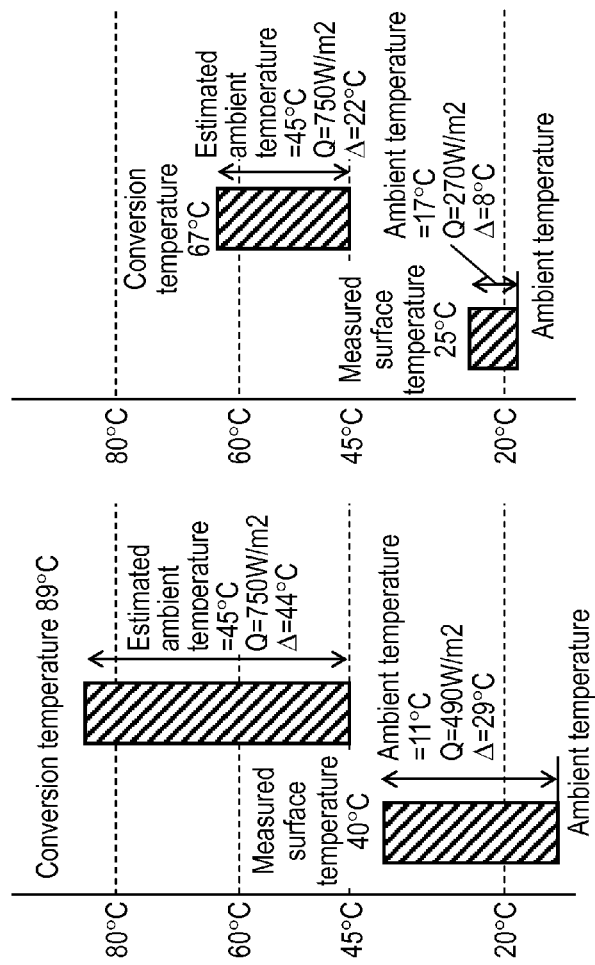
FIG. 7B is a diagram showing another result of the comparative experiment of temperature increase using a lenticular lens sheet.
Figure 7C:
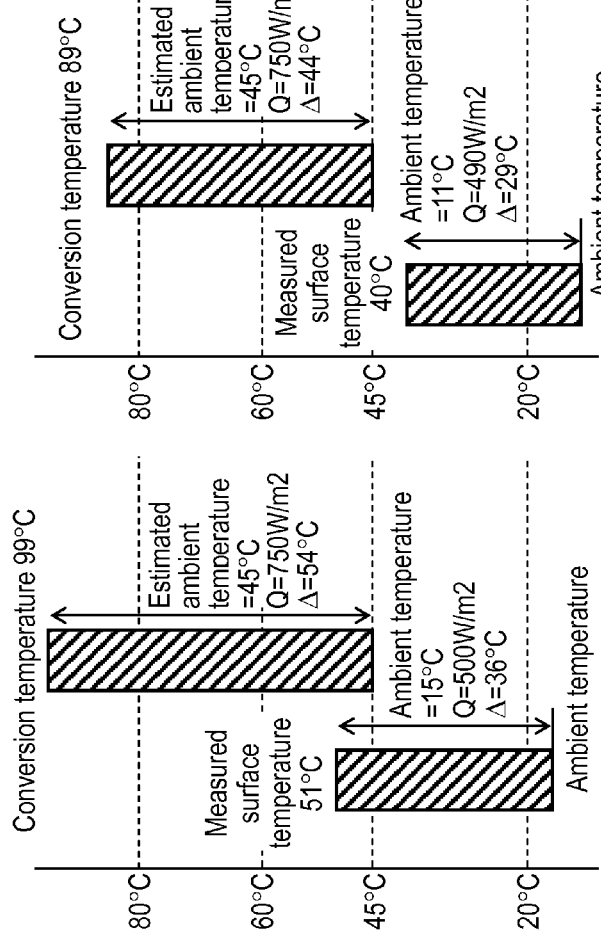
FIG. 7C is a diagram showing yet another result of the comparative experiment of temperature increase using a lenticular lens sheet.
Figure 7D:
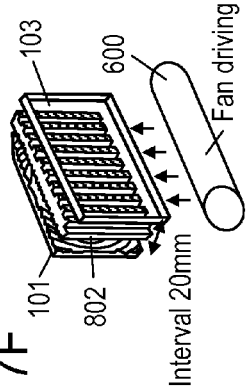
FIG. 7D is a diagram showing the structure of the transmissive screen corresponding to FIG. 7A.
Figure 7E:
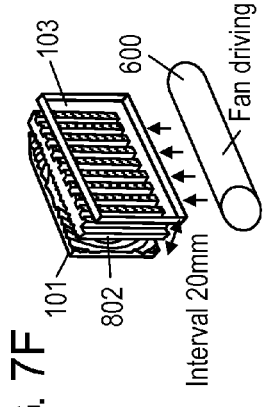
FIG. 7E is a diagram showing the structure of the transmissive screen corresponding to FIG. 7B.
Figure 7F:
FIG. 7F is a diagram showing the structure of the transmissive screen corresponding to FIG. 7C.
Figure 11:
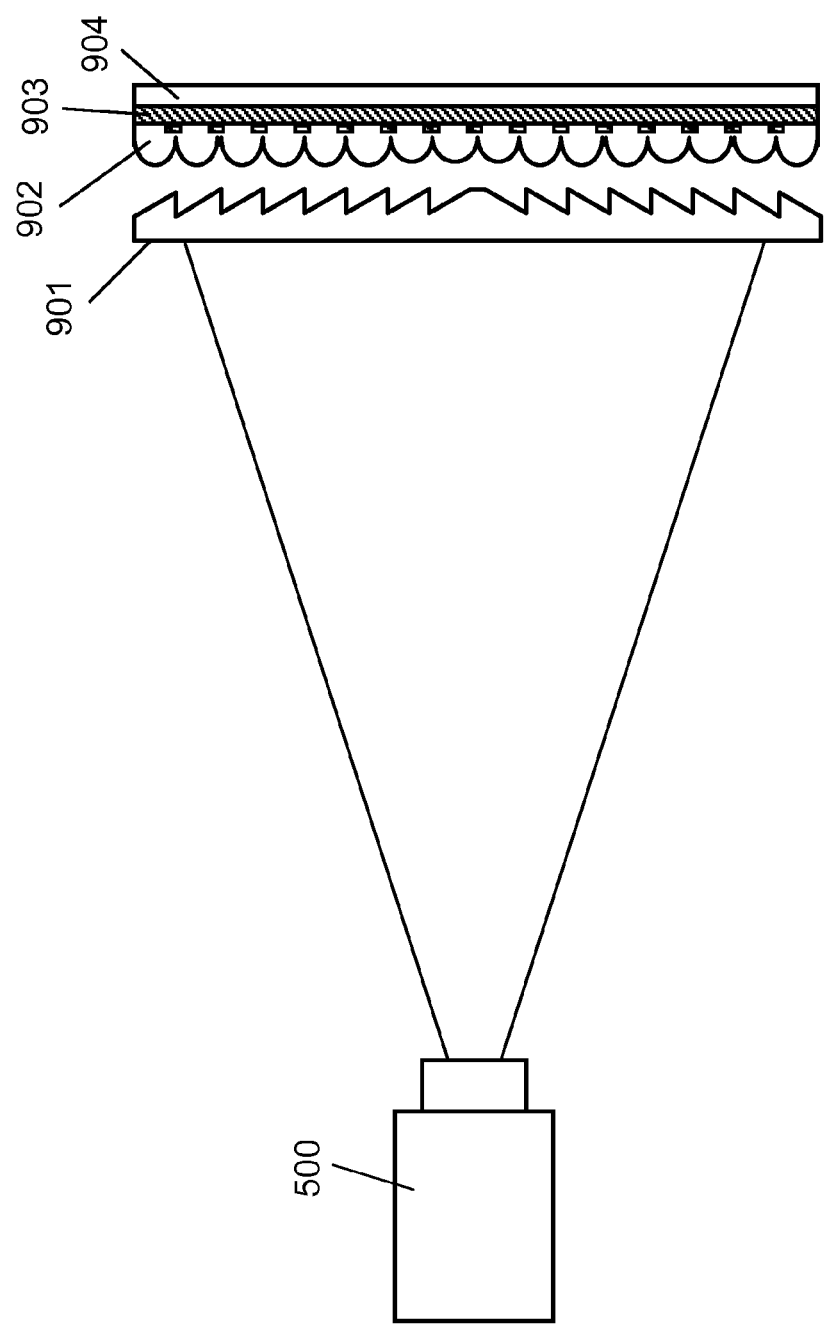
FIG. 11 is a sectional view showing a schematic structure of one example of a conventional transmissive screen.
Figure 12:
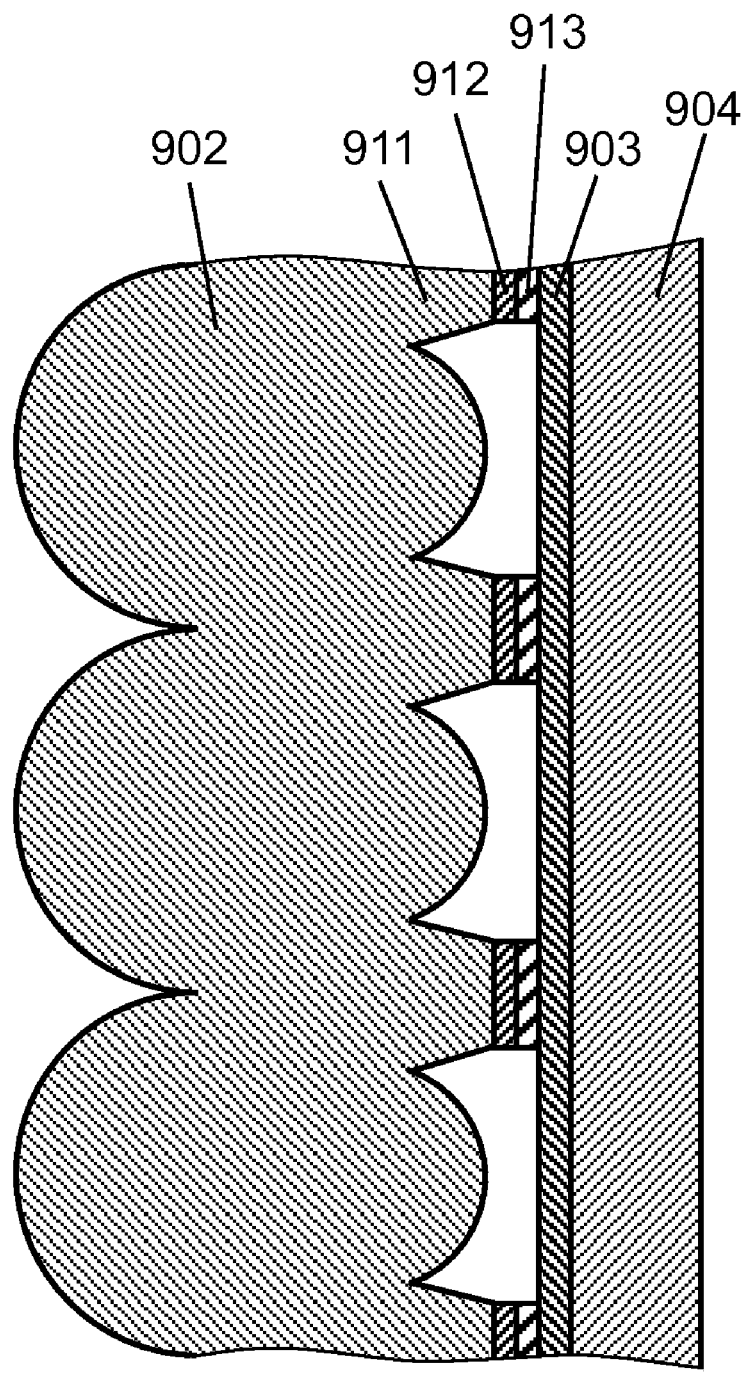
FIG. 12 is a partial sectional view showing a detailed structure of the conventional transmissive screen.

First, FIG. 7A and FIG. 7D are described. In the shown structure, Fresnel lens 101 is stuck to lenticular lens sheet 802, and the distance between lenticular lens sheet 802 and front-surface protective panel 103 is set to 2 mm. When light of energy density of 500 W/m$^2$ is radiated, the measured temperature is 51° C. This indicates temperature increase of 36° C. from the ambient temperature of 15° C.

In order to normalize this result to allow comparison with later experiments and in order to compare it with a guaranteed temperature in an actual using state, this result is converted assuming that estimated ambient temperature is 45° C. and the energy density of the radiated light is 750 W/m$^2$. In the converting method, it is assumed that the temperature increase is proportional to the energy density of light, and the values are shifted by the ambient temperature. As a result, the conversion temperature is 99° C.

In the experiment of FIG. 7B and FIG. 7E, the distance between lenticular lens sheet 802 and front-surface protective panel 103 is set to 20 mm in the shown structure. This corresponds to air flow layer 104 of the characteristic structure of the present invention. Infrared reflecting layer 201 is disposed on the surface of front-surface protective panel 103. When the temperature is measured at energy density of radiated light of 490 W/m$^2$, the measured temperature is 40° C. as a result. This value shows temperature increase of 29° C. from ambient temperature of 11° C., and the conversion temperature is 89° C.

In the experiment of FIG. 7C and FIG. 7F, as in the shown structure, air flow is forcibly generated using fan 600 in air flow layer 104 whose width is set to 20 mm from the structure of FIG. 7E. In FIG. 7F, there is no infrared reflecting layer 201 on the surface of front-surface protective panel 103. When the temperature is measured at energy density of radiated light of 270 W/m$^2$, the measured temperature is 25° C. as a result. This value shows temperature increase of 8° C. from ambient temperature of 17° C., and the conversion temperature is 67° C.

Next, experimental results using diffusion plate 102 as a component of the present invention are described with reference to FIG. 8A through FIG. 8F.

In FIG. 8A and FIG. 8D, the transmissive screen is formed of Fresnel lens 101, diffusion plate 102, and front-surface protective panel 103 in the above-mentioned structure.

Fresnel lens 101 is stuck to diffusion plate 102, and the distance between diffusion plate 102 and front-surface protective panel 103 is set to 2 mm. When light of energy density of 235 W/m² is radiated, the measured temperature is 41° C. This indicates temperature increase of 19.4° C. from the ambient temperature of 21.6° C., and the conversion temperature is 83° C.

FIG. 8B shows the conversion temperature estimated from the experiment of FIG. 7B. In FIG. 8E, when it is assumed that the distance between diffusion plate 102 and front-surface protective panel 103 is 20 mm, and infrared reflecting layer 201 is installed on the surface of front-surface protective panel 103 similarly to FIG. 7E, the conversion temperature is estimated to be 10° C. lower than the conversion temperature of FIG. 8A. This is estimated from the difference (10° C.) between conversion temperature (99° C.) of FIG. 7A and conversion temperature (89° C.) of FIG. 7B. Therefore, the conversion temperature can be estimated as 73° C. in the structure of FIG. 8E.

In the experiment of FIG. 8C and FIG. 8F, as in the shown structure, air flow is forcibly generated using fan 600 in air flow layer 104 whose width is set to 20 mm from the structure of FIG. 8E. In FIG. 8F, there is no infrared reflecting layer 201 on the surface of front-surface protective panel 103. When the temperature is measured at energy density of radiated light of 436 W/m², the measured temperature is 22.3° C. as a result. This value shows temperature increase of 3.7° C. from ambient temperature of 18.6° C., and the conversion temperature is 51° C.

These experimental results are evaluated. When lenticular lens sheet 802 having a black stripe is eliminated and diffusion plate 102 is used as in the present invention, the temperature increase of components caused by radiation of light can be suppressed. Disposing air flow layer 104 having an appropriate distance between diffusion plate 102 and front-surface protective panel 103, and disposing infrared reflecting layer 201 on the surface of front-surface protective panel 103 suppress the temperature increase of the components, in the characteristic of the present invention.

Disposing air flow layer 104 allows forcible air flow to be generated between diffusion plate 102 and front-surface protective panel 103, and hence can suppress temperature increase. According to the experiments, it is highly effective that the width of the air flow layer is 2 mm or greater, or is near 20 mm and between 10 mm and 30 mm.

The guaranteed temperature of heat resistance of the lenticular lens is generally 60° C. in an actual using site, and the conventional structure cannot bear with use outdoors. A plate material such as a diffusion plate or front-surface protective panel is easily available whose guaranteed temperature of heat resistance is 80° C. or higher. Therefore, a sufficient transmissive screen can be provided that has the structure of the present invention and is used for a rear projector used outdoors firstly.

FIG. 9A and FIG. 9B are diagrams for illustrating a cooling method of transmissive screen 100 when power supply to the rear projector stops due to a power failure or the like. As shown in FIG. 9A, solar panels 421 and 422 and battery 423 are disposed on the outer surfaces of case 400 of the rear projector, for example on the top surface and front panel (door part). Cross fan 600 is disposed in the upper part of transmissive screen 100.

Solar panels 421 and 422 have a function of performing photovoltaic power generation, can supply self-generated electric power to cross fan 600 and the other driving components, and can drive them. Even when the power supply to the rear projector stops due to a power failure, a natural disaster, or an unintentional or intentional accident, transmissive screen 100 can be cooled, and the temperature increase of transmissive screen 100 can be suppressed to protect the transmissive screen. Battery 423 can be used by combination with solar panels, and the electric power supplied from solar panels 421 and 422 can be accumulated. Therefore, when power supply to the rear projector stops due to some reason, and when the power supply function from solar panels 421 and 422 degrades at night or the like or when large amount of power is required temporarily, electric power is effectively supplied.

As shown in FIG. 9A, cross fan 600 is disposed in the upper part of the inside (the side facing reflector 410) of transmissive screen 100. When the temperature of transmissive screen 100 increases to a certain temperature or higher due to the outside air or direct sunlight, cross fan 600 operates and cools transmissive screen 100. As shown in FIG. 9B, cooling air A is made to pass air flow layer 104 (FIG. 5) of transmissive screen 100, is exhausted in the axial direction of cross fan 600, and can efficiently cool transmissive screen 100.

Third Exemplary Embodiment

FIG. 10A through FIG. 10D are sectional views showing schematic structures of front-surface protective panel 403 of transmissive screen 200 in accordance with a third exemplary embodiment of the present invention. The structure of front-surface protective panel 403 is different from that in the first exemplary embodiment of the present invention shown in FIG. 2. FIG. 10B, FIG. 10C, and FIG. 10D are partially enlarged views showing a detailed structure of FIG. 10A. In FIG. 10A through FIG. 10D, elements similar to those in FIG. 2 are denoted with the same reference marks, and the descriptions of those elements are omitted.

When a rear projector is installed outdoors, front-surface protective panel 403 disposed on an observer side of transmissive screen 200 is exposed to the outside of the device. Therefore, the variety of installation conditions such as temperature/humidity or illumination is increased and unspecified person can touch front-surface protective panel 403 in various conditions, differently from the case where the projector is installed indoors. Therefore, it is important to secure the quality of front-surface protective panel 403, such as strength against vibration or impact, weathering resistance, or visibility of a display image. Specifically, in the rear projector of FIG. 1 estimated to be used outdoors, practical comprehensive measures are required in transmissive screen 200. Here, the practical comprehensive measures include measures against temperature increase inside the case by direct sunlight or the like, mechanical strength such as prevention of crack by vibration or impact, and measures against reflection of an image other than the display image.

In transmissive screen 200 of the third exemplary embodiment of the present invention, required measures are taken in front-surface protective panel 403.

First, front-surface protective panel 403a having the structure of FIG. 10B is described. In FIG. 10B, front-surface protective panel 403a has a three-layer structure including the following elements:

protective substrate 403ab;
front-surface protective layer 403aa disposed on the observer side A (the side facing the observer) of protective substrate 403ab; and
rear-surface protective layer 403ac disposed on the projection side B (opposite side to the observer) of protective substrate 403ab.

Protective substrate 403ab is made of glass material having a function of protecting transmissive screen 200 and strength against external force. Front-surface protective layer 403aa is an antireflection layer having a function of preventing or suppressing reflection of light. Rear-surface protective layer 403ac is a light shielding layer having a function of shielding light of a partial wavelength region. Protective substrate 403ab is made of tempered glass, front-surface protective layer 403aa is formed of a mat film, and rear-surface protective layer 403ac is formed of at least one of an ultraviolet cut film and an infrared cut film.

Components of front-surface protective panel 403a are described in detail. Front-surface protective layer 403aa has a function of preventing reflection of an image other than a display image and a function of preventing scattering when protective substrate 403ab breaks.

Protective substrate 403ab is made of tempered glass having crack strength that is 2-3 times that of general glass, and has a function of preventing transmissive screen 200 from deformation or crack.

When the tempered glass is used for protective substrate 403ab, the relationship between the strength and surface smoothness of the glass needs to be considered. Compressive stress is applied to the surface of the tempered glass in a manufacturing process by a physical method or chemical method, so that the composition of the glass surface changes and the smoothness degrades in this process. Therefore, protective substrate 403ab has the following problems:

the surface smoothness degrades when the strength of the tempered glass is increased;
the quality of the so called "reflection" changes, where "reflection" shows that an image (other than the display image) of an object or the like existing around transmissive screen 200 is reflected in the display surface; and
the display image quality further degrades comparing with the case where the surface of the tempered glass is smooth.

In other words, the surface of the tempered glass undulates, so that the reflected light on the glass surface does not uniform, the reflected image skews, and the image gives the observer uncomfortable feeling.

Front-surface protective layer 403aa employing the mat film can be formed by sticking a material where particulates for scattering light are dispersed on the surface of an optically transparent substrate to form a fine mat layer or a material having a matted surface to protective substrate 403ab through a transparent adhesive.

When front-surface protective layer 403aa employs the mat film, there are problems that scattering of the reflected light causes reduction of contrast and scattering of transmitted light causes reduction of resolution of the display image. However, front-surface protective layer 403aa is hardly affected by the surface smoothness of protective substrate 403ab, so that the strength of the tempered glass used for protective substrate 403ab can be increased comparing with the case of use of an antireflection film or the like. Since the film is used, the effect of preventing scattering is high when protective substrate 403ab breaks.

Next, front-surface protective panel 403b having the structure of FIG. 10C is described. In FIG. 10C, front-surface protective panel 403b has a three-layer structure including protective substrate 403bb, front-surface protective layer 403ba, and rear-surface protective layer 403bc. Protective substrate 403bb and rear-surface protective layer 403bc are tempered glass and a light shielding layer, respectively, similarly to FIG. 10B.

In the structure of FIG. 10C, as front-surface protective layer 403ba, an antireflection film (hereinafter referred to as "antireflection (AR) dip") formed by a dip method is used instead of the mat film of FIG. 10B. A method in which the antireflection film formed by applying an antireflection solvent to a substrate such as polyethylene terephthalate (PET) is used as the front-surface protective layer is unsuitable for transmissive screen 200 for the outdoors. That is because the antireflection film peels by exposure to direct sunlight. The AR dip has high weathering resistance and can be used for a rear projector in the outdoors where it is exposed to direct sunlight, comparing with the antireflection film.

The AR dip is formed by sticking the antireflection solvent to protective substrate 403bb and forming the antireflection film on protective substrate 403bb by heat treatment with a dip coating device. This antireflection film works as an optical interference layer. In other words, the antireflection film causes interference between the outside lights that are reflected on the front surface and rear surface of the optical interference layer, thereby attenuating the reflected light.

When the AR dip is used, a thin film having a surface property better than the mat film is used and hence the AR dip is directly affected by the surface property of the tempered glass used as protective substrate 403bb. In other words, when the smoothness of the tempered glass is low, the quality of "reflection" changes and the display image quality degrades as discussed above. Therefore, the tempered glass needs to have high smoothness, and the glass strength is difficult to be increased and the scattering preventing function is not effective comparing with the using case of the mat film. In the AR dip, however, the surface roughness can be reduced, blurring is low, and high-definition image display is allowed. The contrast is made sharp by reducing the luminous reflectance. Thus, a rear projector that has low reflection and high visibility can be formed.

When the glass strength and the prevention of scattering of glass fragments in breaking are emphasized regarding front-surface protective panel 403, front-surface protective layer 403aa (mat film) is used. When visibility such as contrast, definition, or reflection is more emphasized than the strength, front-surface protective layer 403ba (AR dip) is used.

Next, front-surface protective panel 403c having the structure of FIG. 10D is described. In FIG. 10D, front-surface protective panel 403c includes protective substrate 403cb, front-surface protective layer 403ca, and rear-surface protective layer 403cc. Protective substrate 403cb and front-surface protective layer 403ca are tempered glass and a mat film, respectively, similarly to FIG. 10B.

In the structure of FIG. 10D, rear-surface protective layer 403cc has a two-layer structure.

Rear-surface protective layer 403cc is disposed in order to prevent direct sunlight or the like from increasing the temperature inside case 400 (FIG. 1) of the rear projector. As a light shielding layer having a function of shielding the light of a partial wavelength region, at least one of an ultraviolet cut layer and an infrared cut layer is formed on the surface (observation surface: front surface) of the observer side and on the surface (projection surface: rear surface) of the projection side of protective substrate 403cb. The ultraviolet cut layer has a function of shielding the transmission of ultraviolet rays by absorbing or reflecting the ultraviolet rays. Similarly, the infrared cut layer has a function of shielding the transmission of infrared rays by absorbing or reflecting the infrared rays.

As shown in FIG. 10D, rear-surface protective layer 403cc is made to have a two-layer structure, and ultraviolet cut layer 403cc1 and infrared cut layer 403cc2 (or ultraviolet cut layer 403cc2 and infrared cut layer 403cc1) are formed in a multilayer structure. This method can form rear-surface protective layer 403cc having a shielding function about ultraviolet rays and infrared rays, and can suppress temperature increase inside case 400 (FIG. 1).

Ultraviolet cut layer 403cc1 and infrared cut layer 403cc2 can be formed by a vacuum deposition method or a spatter method, or may be formed by sticking an ultraviolet cut film and infrared cut film to protective substrate 403cb. A component of ultraviolet cut may be kneaded with an adhesive when an infrared cut film is bonded to protective substrate 403cb. Similarly, a component of infrared cut may be kneaded with an adhesive when an ultraviolet cut film is bonded to protective substrate 403cb. As the front-surface protective layer 403ca of FIG. 10D, an AR dip may be used instead of the mat film.

The design parameters are determined so as to form an optimal structure of front-surface protective panel 403 comprehensively considering the following various conditions. The design parameters include the strength and smoothness of the tempered glass used for protective substrates 403ab, 403bb, and 403cb, the structure and characteristic of the material used for front-surface protective layers 403aa, 403ba, and 403ca, and the structure and characteristic of the material used for rear-surface protective layers 403ac, 403bc, and 403cc. The conditions include the manufacturing cost of front-surface protective panel 403, contrast of a display image, blurring of the display image, temperature increase inside case 400, reflection of an unnecessary image in the display screen, and strength of front-surface protective panel 403.

As discussed above, front-surface protective panel 403 of the third exemplary embodiment of the present invention is effective against the following practical problems, and certainly exerts the effect in transmissive screen 200 of the rear projector for the outdoors. The practical problems include the temperature increase inside the case by direct sunlight or the like, the mechanical strength against vibration or impact, scattering when the screen breaks, and reflection of an image other than the display image. Therefore, a transmissive screen for the outdoors of high quality and high practicability can be achieved.

INDUSTRIAL APPLICABILITY

A transmissive screen and a diffusion plate of the present invention have not only sharp outside light contrast but also high heat resistance against direct sunlight, and are useful for a rear projector for the outdoors requiring high quality about weathering resistance, strength, and visibility of a display image.

REFERENCE MARKS IN THE DRAWINGS 100, 200 transmissive screen
101 Fresnel lens
102 diffusion plate
103, 403, 403a, 403b, 403c front-surface protective panel
104 air flow layer
201 infrared reflecting layer
301 tint sheet
302 transparent base
400 case
403aa, 403ba, 403ca front-surface protective layer
403ab, 403bb, 403cb protective substrate
403ac, 403bc, 403cc rear-surface protective layer
403cc1 ultraviolet cut layer
403cc2 infrared cut layer
410 reflector
421, 422 solar panel
423 battery
500 projector
600 fan
802, 902 lenticular lens sheet
901 Fresnel lens sheet
903 light diffusion layer
904 transparent substrate
911 land section
912 light absorption layer
913 transparent adhesive
A observer side
B projection side

The invention claimed is:

1. A transmissive screen comprising, sequentially from a projection side:
    a Fresnel lens having a condensing function;
    a diffusion plate for diffusing incident light; and
    a front-surface protective panel disposed facing the diffusion plate across an air flow gap therebetween of a predetermined interval,
    wherein the transmissive screen does not include a lenticular lens sheet, the diffusion plate does not include a black stripe for absorbing visible light, and the front-surface protective panel partially absorbs visible light.

2. The transmissive screen of claim 1, wherein
the diffusion plate partially absorbs visible light.

3. The transmissive screen of claim 1, wherein
visible light absorbance of the fronturface protective panel is the highest compared with the Fresnel lens and the diffusion plate.

4. The transmissive screen of claim 1, wherein
heat-resistant temperature of the front-surface protective panel is higher than heat-resistant temperature of at least the diffusion plate.

5. The transmissive screen of claim 4, wherein
the front-surface protective panel is made of one of glass, acrylic resin, and polycarbonate resin.

6. The transmissive screen of claim 1, wherein
antistatic treatment is applied to a surface of the protective panel.

7. A diffusion plate used for the transmissive screen of claim 1.

8. A transmissive screen comprising, sequentially from a projection side:
    a Fresnel lens having a condensing function;
    a diffusion plate for diffusing incident light; and
    a front-surface protective panel disposed facing the diffusion plate across an air flow gap therebetween of a predetermined interval,
    wherein the transmissive screen does not include a lenticular lens sheet, the diffusion plate does not include a black stripe for absorbing visible light, and a layer for absorbing or reflecting infrared rays is formed on the front-surface protective panel.

9. The transmissive screen of claim 8 , wherein
heat-resistant temperature of the front-surface protective panel is higher than heat-resistant temperature of at least the diffusion plate.

10. A transmissive screen comprising, sequentially from a projection side:
    a Fresnel lens having a condensing function;
    a diffusion plate for diffusing incident light; and
    a front-surface protective panel disposed facing the diffusion plate across an air flow gap therebetween of a predetermined interval, wherein the transmissive screen does not include a lenticular lens sheet, the diffusion plate does not include a black stripe for absorbing visible light, and a layer for absorbing or reflecting ultraviolet rays is formed on the front-surface protective panel.

11. The transmissive screen of claim 10, wherein heat-resistant temperature of the front-surface protective panel is higher than heat-resistant temperature of at least the diffusion plate.

12. A transmissive screen comprising, sequentially from a projection side:
   a Fresnel lens having a condensing function;
   a diffusion plate for diffusing incident light; and
   a front-surface protective panel disposed facing the diffusion plate across an air flow gap therebetween of a predetermined interval,
   wherein the transmissive screen does not include a lenticular lens sheet, and the diffusion plate does not include a black stripe for absorbing visible light, and
   wherein the front-surface protective panel has a protective substrate, a front-surface protective layer disposed on an observer side of the protective substrate, and a rear-surface protective layer disposed on the projection side of the protective substrate.

13. The transmissive screen of claim 12, wherein the protective substrate is glass material, the front-surface protective layer is an antireflection layer having a function of preventing or suppressing reflection of light, and the rear-surface protective layer is a light shielding layer having a function of shielding light of a partial wavelength region.

14. The transmissive screen of claim 13, wherein the protective substrate is tempered glass, the front-surface protective layer is a mat film, and the rear-surface protective layer is formed of at least one of an ultraviolet cut film and an infrared cut film.

15. The transmissive screen of claim 13, wherein the protective substrate is tempered glass, the front-surface protective layer is an antireflection film formed by a dip method, and the rear-surface protective layer is formed of at least one of an ultraviolet cut film and an infrared cut film.

16. The transmissive screen of claim 14, wherein the rear-surface protective layer is formed of two layers, the two layers are an ultraviolet cut film layer and an infrared cut film layer.

17. The transmissive screen of claim 15, wherein the rear-surface protective layer is formed of two layers, the two layers are an ultraviolet cut film layer and an infrared cut film layer.

\* \* \* \* \*